June 8, 1965  C. A. ELLIS  3,187,947
CHEMICAL PROPORTIONER
Filed April 12, 1963
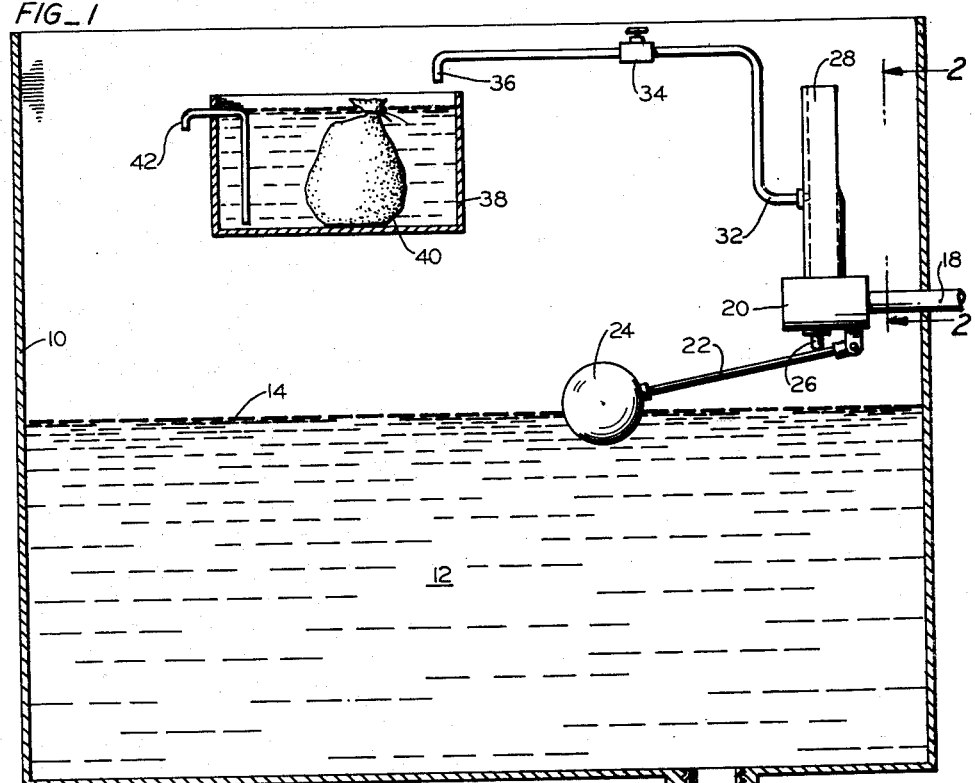
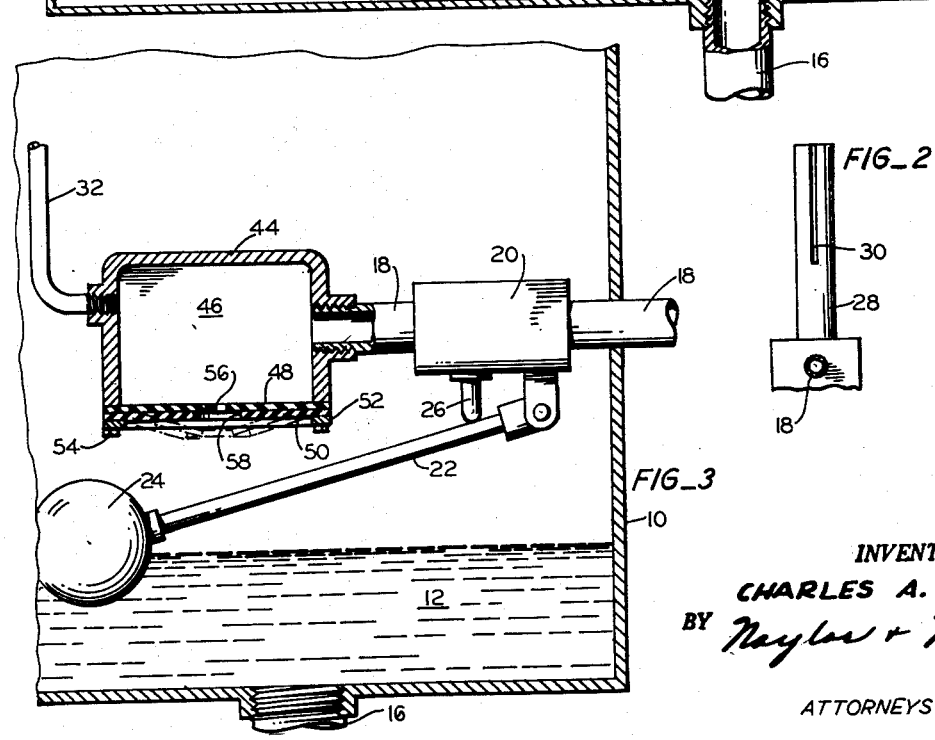
INVENTOR.
CHARLES A. ELLIS
BY *Naylor + Neal*
ATTORNEYS 3,187,947
CHEMICAL PROPORTIONER
Charles A. Ellis, Portola Valley, Calif., assignor to Skasol Incorporated, San Francisco, Calif., a corporation of California
Filed Apr. 12, 1963, Ser. No. 272,774
6 Claims. (Cl. 222—57)

This invention relates to liquid handling apparatus and more particularly to apparatus for maintaining predetermined concentrations of chemical treating agents in liquid handling systems such as water boilers and the like.

In the operation of many types of water cooling systems, boilers and the like, a body of circulating liquid is provided in which it is desirable to maintain a predetermined concentration of a chemical treating agent which reduces corrosion in the system or provides some other advantageous effect. In most of these systems, fresh water must be added continuously to replace water which is lost through evaporation, transportation out of the system on articles being treated, etc. and since fresh water must be added to the system, fresh treating agent must be added to maintain the predetermined concentration. The fresh treating agent may be added by providing a reservoir of water containing the predetermined concentration of agent, but where the treating agent is employed in very small concentrations and where large volumes of replacement water as necessary, it is impractical to add the treating agent in this manner.

It is an object of this invention to provide apparatus by which treating agents may be added to liquid handling systems to maintain a predetermined concentration of the treating agent in the liquid while permitting the replacement treating agent to be dispensed in the form of a concentrate which may be stored in a relatively small concentrate reservoir in the apparatus.

It is another object of the invention to provide such apparatus which will maintain the predetermined concentration of treating agent in the liquid system automatically as the volume of fresh liquid added to the system varies between widely spaced limits.

It is another object of the invention to provide such apparatus which is very simple and inexpensive in construction and which employs a minimum number of moving parts so that the apparatus may be used for long periods of time with little attention aside from periodic replenishment of the chemical treating agent in the reservoir.

It is another object of the invention to provide such apparatus which is particularly useful in dispensing into a liquid handling system a treating agent which is normally solid but partially soluable in the liquid in the system.

Other objects and advantages of the invention will become apparent from the following description read in conjunction with the attached drawings in which:

FIG. 1 is a vertical sectional view through apparatus incorporating the principles of this invention;

FIG. 2 is a fragmentary view of the apparatus of FIG. 1 taken along the plane indicated at 2—2 in FIG. 1, and FIG. 3 is an enlarged fragmentary view of an alternative form of apparatus of this invention.

Referring now in detail to the drawings and particularly to FIG. 1, the apparatus illustrated therein includes a header 10 containing a body of liquid 12 having a normal liquid level 14 with the header having an outlet 16 by which the body of liquid 12 communicates with the remainder of a water handling system. A water recirculating conduit (not shown) may be provided for returning water from the outlet 16 to the interior of the header 10.

A water inlet conduit 18 extends into the header 10 and is connected to a liquid level responsive valve 20 having a conventional arm and float 22 and 24 respectively which manipulate a plunger 26 to deliver increasing volumes of water from the conduit 18 to an upstanding tube 28 having a chamber therein open at its upper end on the top of valve 20. As indicated in FIG. 2, the tube 28 has in its side wall an elongated aperture 30 through which water flows from the valve 20 to the body of water 12. As the valve 20 is opened to a greater extent responsive to lowering of the liquid level 14, increasing volumes of water flowing upwardly through the tube 28 rise above the lower edge of the slit 30 so that the cross sectional area of the slit 30 through which water flows increases as the volume of water passing through the valve 20 increases, and the accompanying increase in pressure head in the tube 28 causes increasing quantities of water to be forced through a small lateral discharge tube 32 hence through a needle valve 34 to be discharged through a spout 36 into a small chemical treating agent reservoir 38. The reservoir 38 contains a porous bag 40 containing solid particles of the treating agent to be dispensed into the body of water 12, and an overflow 42 is provided on the opposite side of the reservoir 38 by which liquid displaced from the reservoir by the water passing through tube 32 falls into the body of water 12.

In this manner, the slitted tube 28 provides an increasing pressure head which increases as a function of the increase in volume of fresh water added to the header with the increasing pressure head providing an extremely small by-pass stream of water passing to the treating agent reservoir 38 to displace from the reservoir an equal small volume of a saturated solution of the treating agent 40. The volume of water entering the reservoir 38 from the tube 32 is sufficiently small that the solid particles of treating agent 40 may dissolve sufficiently rapidly to maintain the solution in the reservoir 38 saturated with the treating agent.

In the apparatus illustrated in FIG. 3 is illustrated a preferred form of pressure discharge means for creating the increasing pressure head which increases responsive to increases in the volume of fresh water being added to the header. In this form of apparatus, a body 44 is connected to the inlet conduit 18 and has an internal chamber 46 therein which receives the volume of water flowing through conduit 18 as regulated by the float valve 20.

On the lower side of the body 44, a pair of flexible diaphrams, an inner diaphram 48 and an outer diaphram 50 are mounted by means of a peripheral ring 52 bolted onto the body 46 by bolts 54. The inner diaphram has a central aperture 56 therein which is smaller than the cross sectional area of the inlet conduit 18, and the outer diaphram carries a central aperture 58 which is larger than and which encircles the aperture 56. The diaphrams 48 and 50 are resilient and flexible so that their flexure permits resilient enlargement of the apertures 56 and 58 responsive to increasing water pressure in the chamber 46 as indicated by the phantom outline position of the diaphrams illustrated in FIG. 3. In the apparatus illustrated in FIG. 3, the by-pass conduit 32 is connected to the chamber 46 to convey the small stream of water from the chamber 46 to displace chemical treating agent from the reservoir 38.

The pressure discharge means 44–58 shown in FIG. 3 is particularly desirable since it may be controlled very readily to provide a pressure fluctuation in the chamber 46 which is exactly proportional to the fluctuation of the volume of water flowing through the chamber 46. In this regard, a pressure discharge means of this type constructed with a single diaphragm 48 three-eighth (3/8) of an inch thick and made of pure gum rubber with a five thirty-seconds (5/32) inch hole 56 in its center provides a substantially linear increase in pressure in the chamber 46 as the volume of water passing through the chamber 46 varies between one and fifteen gallons per minute. The aperture 56 in the diaphragm enlarges as the pressure in chamber 46 increases to permit the larger volumes of water to pass through the diaphragm without increasing the pressure excessively. Where it is desirable to permit even higher volumes of water to pass through the chamber 46, with correspondingly larger expansion of the aperture 56, the second diaphragm 50 with its aperture 58 provides a cooperative effect with the diaphragm 48 to permit the linear pressure volume relation to be maintained.

In the apparatus illustrated herein, the reservoir 38 is employed for dispensing into the liquid system a chemical treating agent which is normally solid, and when the treating agent is used up, the bag 40 may be merely replaced by a new porous bag full of chemical treating agent. Additionally, where it is desirable to dispense a normally liquid chemical treating agent or an agent which is miscible with the liquid 12, other forms of reservoir means 38 may be employed such as the reservoir means shown in an application filed herewith where the by-pass liquid which leaves the chamber 46 through conduit 32 displaces liquid treating agent from the reservoir without diluting it. In both cases, however, where the pressure in the chamber 46 increases as a linear function of the volume of water passing through the chamber, the amount of liquid delivered to the reservoir means has a volume which is a linear function of the volume of liquid passing through the chamber 46 so that an exact proportion is maintained between the volume of fresh water and the volume of treating agent added to the system.

While several specific embodiments of this invention have been illustrated and described in detail herein, it is obvious that many modifications thereof may be made without departing from the spirit and scope of the invention.

What is claimed is:

1. In a liquid handling system having a body of liquid with a variable liquid level, a liquid inlet conduit for delivering replacement liquid to said body of liquid, and a liqud level responsve valve in said inlet conduit for increasing the volume of liquid delivered from said inlet conduit responsive to reduction in the liquid level of said body of liquid, the improved means for maintaining a predetermined concentration of a chemical treating agent in said body of liquid which comprises:
   (A) pressure discharge means connected to said inlet conduit for increasing the pressure of liquid delivered from said inlet conduit responsive to increases in the volume of said liquid, said pressure discharge means having
      (1) a chamber communicating with said inlet conduit and
      (2) permanently open outlet means for liquid flow from said chamber to said body of liquid with the area of said outlet means through which liquid flows increasing as the liquid pressure in said chamber increases,
   (B) reservoir means containing a concentrated chemical treating agent and communicating with said body of liquid to deliver incremental amounts of said treating agent to said body of liquid responsive to the delivery of incremental amounts of liquid to said reservoir means, and
   (C) conduit means connecting said reservoir means to said chamber for delivering increasing amounts of liquid to said reservoir means from said chamber responsive to increasing pressure in said chamber.

2. The apparatus of claim 1 in which said reservoir means comprises an open container mounted over said body of liquid to deliver to said body of liquid liquid overflowing from said container said container containing a quantity of the same lquid as the liquid in said body of liquid and solid particles of said chemical treating agent with said quantity of liquid forming a saturated solution of said chemical treating agent.

3. In a liquid handling system having a body of liquid with a variable liquid level, a liquid inlet conduit for delivering replacement liquid to said body of liquid, and a liquid level responsive valve in said inlet conduit for increasing the volume of liquid delivered from said inlet conduit responsive to reduction in the liquid level of said body of liquid, the improved means for maintaining a predetermined concentration of a chemical treating agent in said body of liquid which comprises:
   (A) pressure discharge means connected to said inlet conduit for increasing the pressure of liquid delivered from said inlet conduit responsive to increases in the volume of said liquid, said pessure discharge means having
      (1) a chamber communicating with said inlet conduit and
      (2) resilient and flexible means forming a wall portion of said chamber and defining a variable area outlet from said chamber which resiliently increases in area by flexure of said flexible means responsive to increase in fluid pressure in said chamber with said outlet arranged to deliver the majority of liquid which is introduced into said chamber,
   (B) reservoir means containing a concentrated chemical treating agent and communicating with said body of liquid to deliver incremental amounts of said treating agent to said body of liquid responsive to the delivery of incremental amounts of liquid to said reservoir means, and
   (C) conduit means connecting said reservoir means to said chamber for delivering increasing amounts of liquid to said reservoir means from said chamber responsive to increasing pressure in said chamber with said conduit means having a smaller effective cross sectional area than said outlet.

4. A plumbing fixture for conveying variable quantities of liquids while developing an internal liquid pressure which is a parameter of the volume of liquid which it conveys which comprises: a body having a chamber therein, a fluid inlet into said chamber having a cross sectional area substantially less than the cross sectional area of said chamber, and a resilient and flexible diaphragm attached to said body and forming a wall of said chamber said diaphragm having a central liquid discharge aperture therein of smaller normal cross sectional area than said inlet conduit with said discharge aperture resiliently increasing in cross sectional area by flexure of said diaphragm responsive to increasing fluid pressure in said chamber, said chamber having at least one other discharge aperture, said central discharge aperture in said diaphragm being larger than any other discharge aperture.

5. In a liquid handling system having a body of liquid with a variable liquid level, a liquid inlet conduit for delivering replacement liquid to said body of liquid, and a liquid level responsive valve in said inlet conduit for increasing the volume of liquid delivered from said inlet conduit responsive to reduction in the liquid level of said body of liquid, the improved means for maintaining a predetermined concentration of a chemical treating agent in said body of liquid which comprises:
   (A) pressure discharge means connected to said inlet conduit for increasing the pressure of liquid delivered from said inlet conduit responsive to increases in the volume of said liquid, said pressure discharge means having
      (1) a chamber communicating with said inlet conduit and
      (2) resilient and flexible means forming a wall portion of said chamber and defining a variable area outlet from said chamber which resiliently increases in area by flexure of said flexible means responsive to increase in fluid pressure in said chamber with said resilient and flexible means comprising inner and outer flexible diaphragms mounted together and together forming a laminated wall of said chamber with said inner diaphragm positioned between the interior of said chamber and said outer diaphragm and with said diaphragms having aligned central apertures therein with the aperture in said inner diaphragm being smaller than the aperture in said outer diaphragm.

6. A plumbing fixture for conveying variable quantities of liquids while developing an internal liquid pressure which is a parameter of the volume of liquid which it conveys which comprises: a body having a chamber therein, a fluid inlet into said chamber having a cross sectional area substantially less than the cross sectional area of said chamber, a resilient and flexible diaphragm attached to said body and forming a wall of said chamber said diaphragm having a central liquid discharge aperture therein of smaller normal cross sectional area than said inlet conduit with said discharge aperture resiliently increasing in cross sectional area by flexure of said diaphragm responsive to increasing fluid pressure in said chamber, and a second flexible diaphragm mounted in engagement with said first flexible diaphragm on the side thereof outside of said chamber with said second diaphragm having an aperture therein larger than and surrounding the aperture in said first diaphragm.

References Cited by the Examiner

UNITED STATES PATENTS

| | | |
|---|---|---|
| 1,771,519 | 7/30 | Allen. |
| 2,670,625 | 3/54 | Snavely _____ 138—45 |
| 3,105,245 | 10/63 | Finkbiner _____ 4—228 |

FOREIGN PATENTS 597,267  1/48  Great Britain.

RAPHAEL M. LUPO, *Primary Examiner.*

HADD S. LANE, *Examiner.*